United States Patent

Imataki et al.

Patent Number: 5,578,184
Date of Patent: Nov. 26, 1996

[54] PATTERNING PROCESS, PROCESS FOR PRODUCING OPTICAL RECORDING MEDIUM, AND PROCESS FOR PRODUCING COLOR FILTER

[75] Inventors: Hiroyuki Imataki, Yokohama; Mizuho Hiraoka, Kawasaki; Kazumi Nagano; Takaya Yano, both of Fujisawa; Hiroshi Tanabe, Kawasaki, all of Japan

[73] Assignee: Canon Kabushiki Kaisha, Tokyo, Japan

[21] Appl. No.: 484,913

[22] Filed: Jun. 7, 1995

Related U.S. Application Data

[63] Continuation of Ser. No. 197,311, Feb. 16, 1994, abandoned.

[30] Foreign Application Priority Data

Feb. 17, 1993 [JP] Japan .................... 5-049917

[51] Int. Cl.⁶ .................................................... C25D 5/02
[52] U.S. Cl. ................................ 205/118; 205/122
[58] Field of Search ............................ 205/118, 122

[56] References Cited

U.S. PATENT DOCUMENTS

| | | | |
|---|---|---|---|
| 4,522,691 | 6/1985 | Suginoya | 205/50 |
| 4,617,094 | 10/1986 | Kamamori | 205/121 |
| 4,704,559 | 11/1987 | Suginoya | 315/169.1 |
| 5,206,750 | 4/1993 | Aizawa | 359/68 |
| 5,214,541 | 5/1993 | Yamasita | 359/891 |
| 5,234,571 | 8/1993 | Noeker | 205/70 |

FOREIGN PATENT DOCUMENTS

| | | |
|---|---|---|
| 0412738A2 | 2/1991 | European Pat. Off. . |
| 0526234A2 | 2/1993 | European Pat. Off. . |
| 61-279003 | 12/1986 | Japan . |
| 2091028 | 7/1982 | United Kingdom . |

*Primary Examiner*—Kathryn Gorgos
*Assistant Examiner*—Brendan Mee
*Attorney, Agent, or Firm*—Fitzpatrick, Cella, Harper & Scinto

[57] ABSTRACT

A process for patterning a substrate by forming electrodeposited layers on the substrate so as to correspond with two or more kinds of patterns has the steps of preparing an electrodeposition original plate having conductive patterns respectively corresponding with patterns in which respective conductive patterns are laid bare and conductive patterns are insulated from each other in such a manner that the electrodeposited layers can be respectively independently formed on the conductive patterns successively, forming the electrodeposited layers on the respective conductive patterns and transferring the electrodeposited layers formed on the respective conductive patterns, to a substrate.

28 Claims, 10 Drawing Sheets

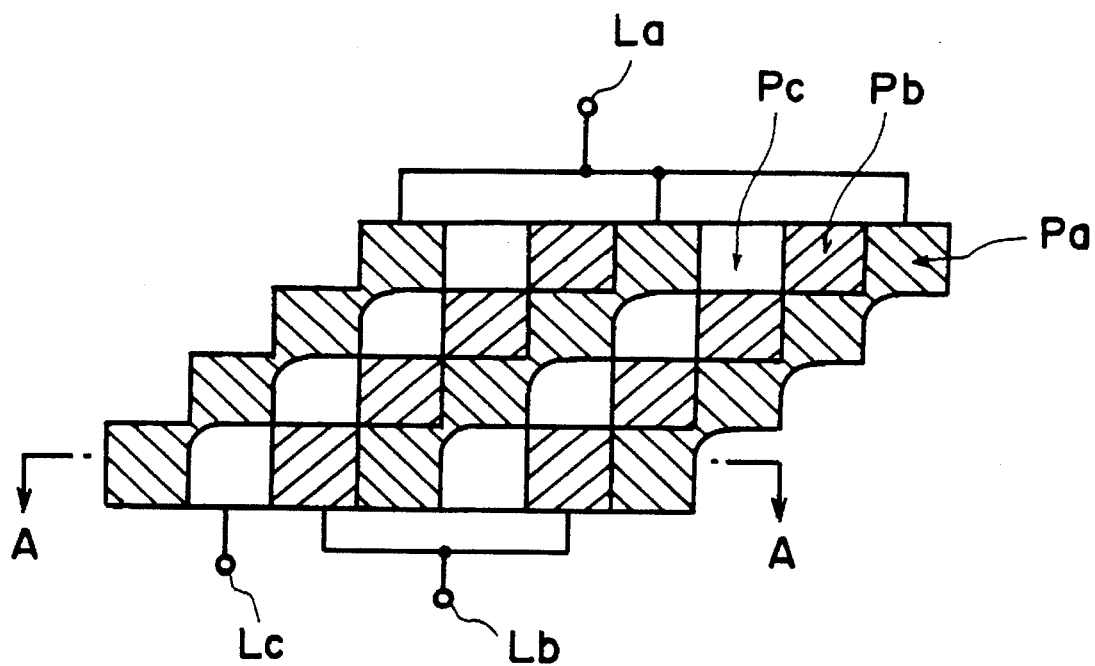
F I G. 1A
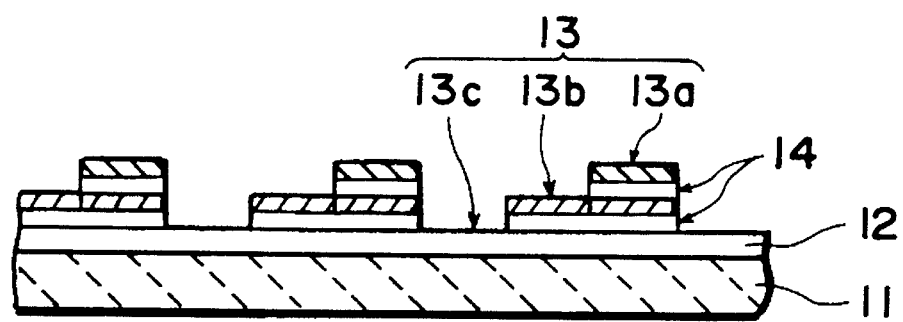
F I G. 1B

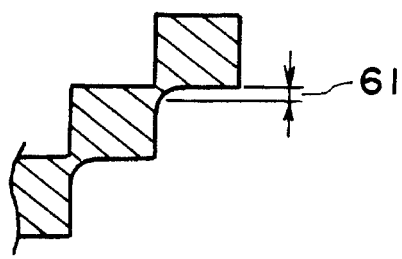
F I G. 6
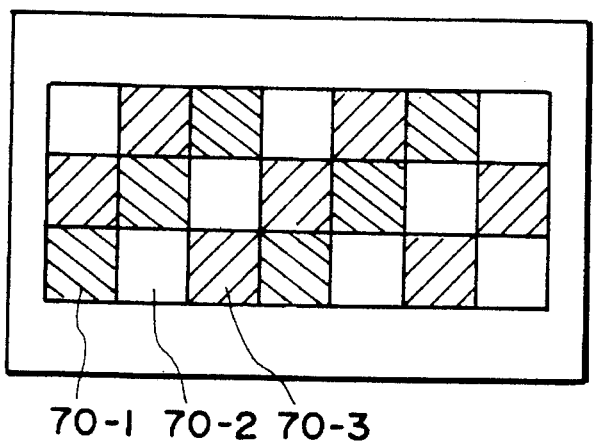
F I G. 7A
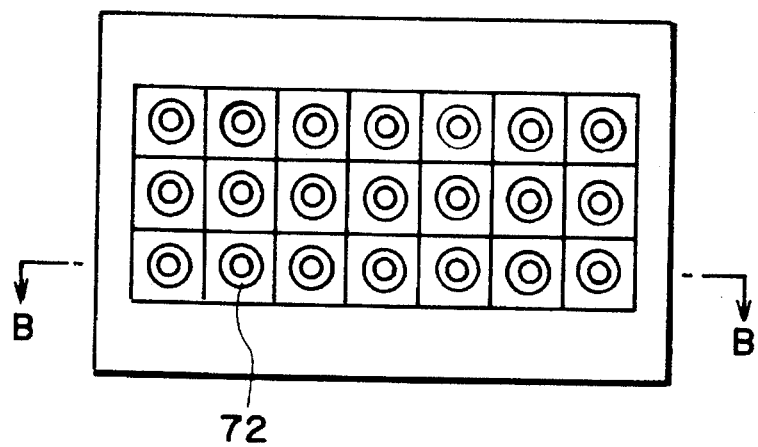
F I G. 7B
F I G. 7C

000

PATTERNING PROCESS, PROCESS FOR PRODUCING OPTICAL RECORDING MEDIUM, AND PROCESS FOR PRODUCING COLOR FILTER

This application is a continuation of application Ser. No. 08/197,311 filed Feb. 16, 1994, which is now abandoned.

BACKGROUND OF THE INVENTION

1. Field of the Invention

This invention relates to a patterning process capable of forming two or more kinds of patterns on a substrate, an electrodeposition original plate used in such a process, and a process for producing an optical recording medium or producing a color filter by the use of such an original plate.

2. Related Background Art

As a method for the production of color filters, the method as disclosed in Japanese Patent Application Laid-open No. 61-279003 is known in the art.

The method will be described with reference to FIGS. 2A to 2F. First, on a transparent substrate 21, a transparent electrode 22 is formed. Then, on the transparent electrode 22, a photoresist layer 23 is formed (FIG. 2A).

Next, the photoresist layer is exposed to light through a mask formed to correspond with a pattern of a first hue (e.g., red), followed by development to bare the transparent electrode (FIG. 2B). Next, on the bared portion of the transparent electrode, a red electrodeposited layer 24 is formed using an electrodepositing solution prepared by dissolving or dispersing a red coloring matter in a resin suitable for electrodeposition (FIG. 2C).

Subsequently, in the same manner, the transparent electrode is bared (FIG. 2D) using a mask formed to correspond with a pattern of a second hue (e.g., green), and then a green electrodeposited layer 25 is formed on the newly bared portion in the manner previously described (FIG. 2E). An electrodeposited layer 26 of a third hue (e.g., blue) is further formed in entirely the same manner. Thus, a color filter is obtained (FIG. 2F).

As an example of the application of this method, a method is known in which, after the electrodeposited layers of the respective hues have been formed, a glass substrate having a transfer layer comprising a coated photocurable adhesive is contact-bonded, to the electrodeposited layers, followed by irradiation with light to cause the electrodeposited layers to transfer to the glass substrate.

This method, which employs a technique of photolithography, has a superior pattern precision compared with other processes for producing color filters, e.g., printing, and also can achieve uniform control of coloring layers according to conditions for electrodeposition. Thus, this method is preferable for producing high quality color filters. When the transfer step described above is used, the substrate on which the electrode has been formed can be reused, making it possible to reduce the cost of producing color filters.

This method, however, requires repeating the steps of preparing mask patterns using insulating photosensitive resins such as photoresists on a conductive layer, in the number corresponding to colors, and forming electrodeposited layers on the bared portion of the conductive layer each time one color filter is produced. In such steps, it is difficult to maintain the positional precision of the patterns of the electrodeposited layers with different hues, and further cost reductions for color filters have been desired.

SUMMARY OF THE INVENTION

The present invention was made taking account the problems discussed above. An object of the present invention is to provide a patterning process that can precisely and inexpensively form two or more kinds of patterns on a substrate.

Another object of the present invention is to provide an electrodeposition original plate usable in a patterning process that can precisely and inexpensively form two or more kinds of patterns on a substrate.

Still another object of the present invention is to provide a process for producing a color filter, that can achieve a superior positional precision between patterns with different hues at a reduced cost.

A further object of the present invention is to provide a process for producing an optical recording medium, that can produce at a low cost an optical recording medium comprising a substrate and a preformat precisely formed thereon.

The patterning process of the present invention is a process for patterning a substrate by forming electrodeposited layers on the substrate so as to correspond with two or more kinds of patterns, wherein said process comprises the steps of;

preparing an electrodeposition original plate having conductive patterns respectively corresponding with said patterns; said respective conductive patterns being laid bare, and said conductive patterns being insulated from each other in such a manner that the electrodeposited layers can be respectively independently formed on the conductive patterns;

successively forming the electrodeposited layers on the respective conductive patterns; and transferring the electrodeposited layers formed on the respective conductive patterns, to a substrate.

The electrodeposition original plate of the present invention is an electrodeposition original plate having two or more kinds of conductive patterns, wherein said respective conductive patterns are laid bare and are formed in such a manner that electrodeposited layers can be respectively independently formed on the conductive patterns.

The process for producing a color filter according to the present invention is a process for producing a color filter comprising a transparent substrate and provided thereon electrodeposited layers with different colors, respectively arranged in patterns, wherein said process comprises the steps of;

preparing an electrodeposition original plate having conductive patterns respectively corresponding with said patterns; said respective conductive patterns being laid bare and being formed in such a manner that the electrodeposited layers can be respectively independently formed on the conductive patterns;

successively forming the electrodeposited layers with given colors on the respective conductive patterns; and transferring the electrodeposited layers formed on the respective conductive patterns, to a transparent substrate.

In another embodiment, the process for producing a color filter according to the present invention is a process for producing a color filter comprising a transparent substrate and provided thereon electrodeposited layers with different colors, respectively arranged in patterns, wherein said process comprises the steps of;

preparing a transparent substrate having conductive patterns respectively corresponding with said patterns;

said respective conductive patterns being laid bare and being formed in such a manner that the electrodeposited layers can be respectively independently formed on the conductive patterns; and successively forming the electrodeposited layers with given colors on the respective conductive patterns.

The process for producing an optical recording medium according to the present invention is a process for producing an optical recording medium comprising a substrate and provided thereon a recording layer having an electrodeposited layer and a preformat layer having an electrodeposited layer, formed in a pattern corresponding to a preformat, wherein said process comprises the steps of;

preparing an electrodeposition original plate having a conductive surface, and provided thereon a first conductive pattern superposingly formed via an insulating layer and having a pattern corresponding with said preformat and a second conductive pattern formed of bared portions of said conductive surface;

immersing said original plate in a preformat layer forming electrodepositing solution to form a first electrodeposited layer on the first conductive pattern, using the first conductive pattern as an electrode;

immersing the original plate on which the first electrodeposited layer has been formed, in a recording layer forming electrodepositing solution to form a second electrodeposited layer on the second conductive pattern, using the second conductive pattern as an electrode; and transferring the first electrodeposited layer and the second electrodeposited layer to a substrate.

In another embodiment, the process for producing an optical recording medium according to the present invention is a process for producing an optical recording medium comprising a substrate and provided thereon a recording layer having an electrodeposited layer and a preformat layer having an electrodeposited layer, formed in a pattern corresponding to a preformat, wherein said process comprises the steps of;

preparing an electrodeposition original plate having a conductive surface, and provided thereon a first conductive pattern superposingly formed via an insulating layer and having a pattern corresponding with said preformat and a second conductive pattern formed of bared portions of said conductive surface;

immersing said original plate in a preformat layer forming electrodepositing solution to form a first electrodeposited layer on the first conductive pattern, using the first conductive pattern as an electrode; and immersing the original plate on which the first electrodeposited layer has been formed, in a recording layer forming electrodepositing solution to form a second electrodeposited layer on the second conductive pattern, using the second conductive pattern as an electrode.

BRIEF DESCRIPTION OF THE DRAWINGS

FIGS. 1A and 1B illustrate an embodiment of the electrodeposition original plate used to produce a color filter according to the present invention, where FIG. 1A is a schematic plan view of the electrodeposition original plate, and FIG. 1B is a cross section along the line A—A in FIG. 1A.

FIG. 6 schematically illustrates portions at which pattern elements of the same kind, adjoining to each other on the electrodeposition original plate of FIGS. 1A and 1B are connected.

FIGS. 7A to 7C schematically illustrate another embodiment of the electrodeposition original plate used to produce a color filter according to the present invention, where FIG. 7A is a schematic plan view of the color filter, FIG. 7B is a schematic plan view of the substrate for the electrodeposition original plate, and FIG. 7C is a cross section along the line B—B in FIG. 7B.

FIG. 8A is a schematic plan view of the substrate of FIG. 7B on the surface of which a resist pattern has been formed, FIG. 8B is a cross section of the substrate along the line C—C in FIG. 8A, and FIG. 8C is a cross section of the substrate of FIG. 8A on the surface of which a conductive layer has been formed.

FIG. 9A is a schematic plan view of the substrate of FIG. 7B on the surface of which a conductive pattern has been formed, and FIG. 9B is a cross section along the line D—D in FIG. 9A.

FIG. 15A is a schematic cross section of the electrodeposition original plate, and FIG. 15B is a schematic cross section of the step of electrodeposition carried out using the electrodeposition original plate of FIG. 15A.

FIG. 16A is a schematic plan view of an optical card, FIG. 16B is an enlarged view of the surface of the optical card, and FIG. 16C illustrates the step of electrodeposition carried out on the electrodeposition original plate used to produce the optical card.

DESCRIPTION OF THE PREFERRED EMBODIMENTS

Figure 2A:
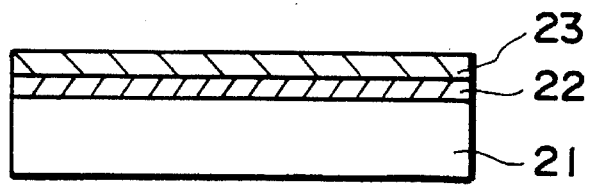
FIGS. 2A to 2F are a flow chart to show a conventional process for producing a color filter by electrodeposition.
Figure 2B:
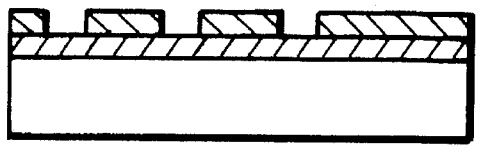
Figure 2C:
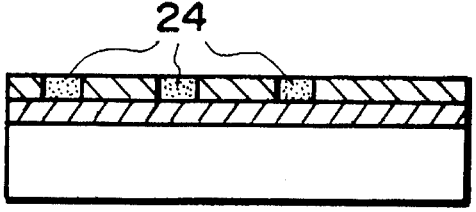
Figure 2D:
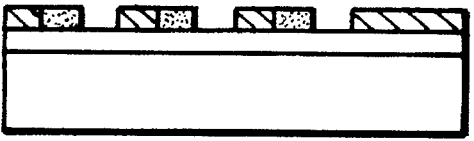
Figure 2E:
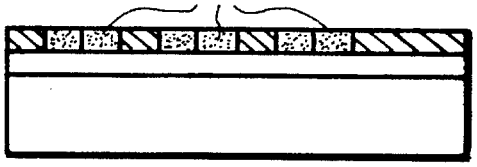
Figure 2F:
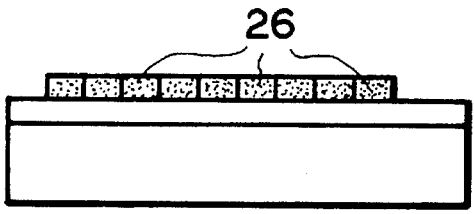

The present invention will be described below in detail with reference to the accompanying drawings.

FIG. 1A is a schematic plan view of an embodiment of the electrodeposition original plate used in the process for producing a color filter according to the present invention, and FIG. 1B is a cross section along the line A—A in FIG. 1A. In these drawings, reference numeral 11 denotes an insulating substrate, and 12 a conductive layer provided on the surface of the substrate. On the conductive layer 12, electrodes 13 are provided in the form of three kinds of patterns Pa, Pb and Pc in such a manner that they respectively correspond to patterns with hues (e.g., red, green and blue) of the three colors constituting a color filter and their surfaces are exposed. The electrode 13c for the pattern Pc corresponds to the bared portion of the conductive layer 12. Electrodes 13a and 13b constituting the patterns Pa and Pb, respectively, are superposingly formed on the conductive layer 12 via insulating layers 14 so that electrodeposition can be independently carried out on the conductive surfaces of the respective patterns. The electrodes 13a and 13b are arranged so that adjacent electrodes constituting the same pattern elements come into contact with each other.

Figure 3:
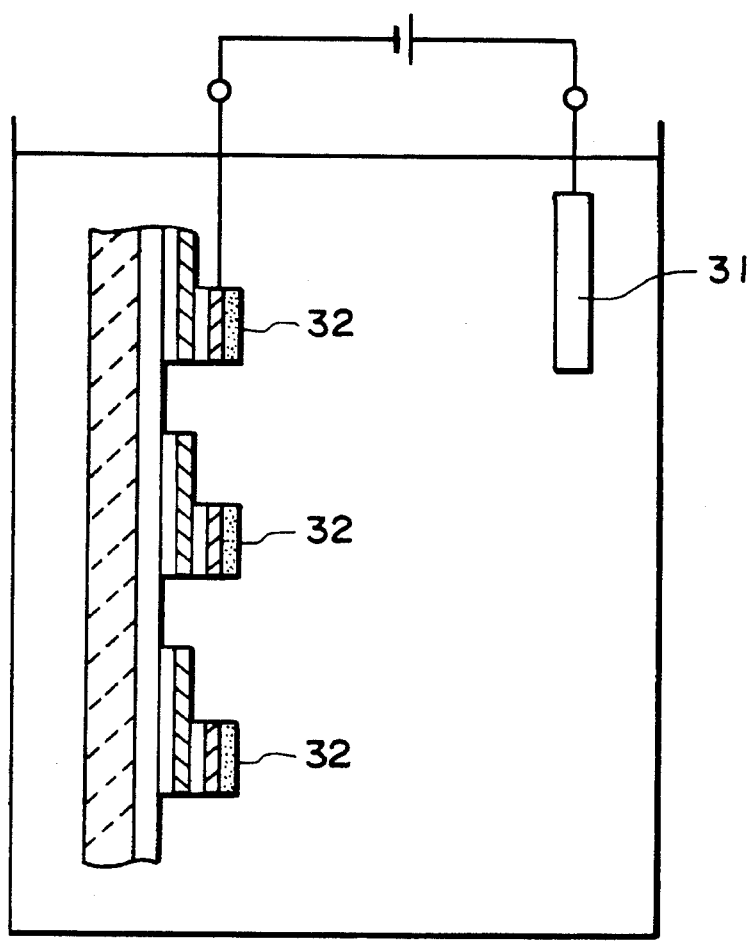
FIG. 3 schematically illustrates the step of electrodeposition carried out using the electrodeposition original plate of FIGS. 1A and 1B.

This electrodeposition original plate is, as shown in FIG. 3, immersed in an electrodepositing solution containing i) an electrodeposited-film forming component as exemplified by a cationic or anionic polymer resin suitable for electrodeposition and ii) an organic coloring matter capable of giving a transparent and desired hue to the electrodeposited film. Voltages are applied across the electrode of each pattern and an opposing electrode 31, whereby electrodeposited films or layers 32 with hues different from each other can be formed on the electrodes.

More specifically, the electrodeposition original plate as shown in FIGS. 1A and 1B is immersed in a first electrodepositing solution containing a cationic polymer resin and an organic coloring matter capable of, e.g., coloring the electrodeposited layer red. Thereafter, a voltage is applied across a terminal La and an opposing electrode 31, whereby a red electrodeposited layer can be formed on the electrode 13 constituting the pattern Pa.

This electrodeposition original plate is then immersed in a second electrodepositing solution containing a resin suitable for electrodeposition and an organic coloring matter capable of coloring the electrodeposited layer green. Thereafter, a voltage is applied across a terminal Lb and an opposing electrode 31, whereby a green electrodeposited layer can be formed on the electrode 13 constituting the pattern Pb.

This electrodeposition original plate is further immersed in a third electrodepositing solution containing a resin suitable for electrodeposition and an organic coloring matter capable of coloring the electrodeposited layer blue. Thereafter, a voltage is applied across a terminal Lc and an opposing electrode 31, whereby a blue electrodeposited layer can be formed on the electrode 13 (i.e., the bared portion of the conductive layer 12) constituting the pattern Pc.

Figure 4A:
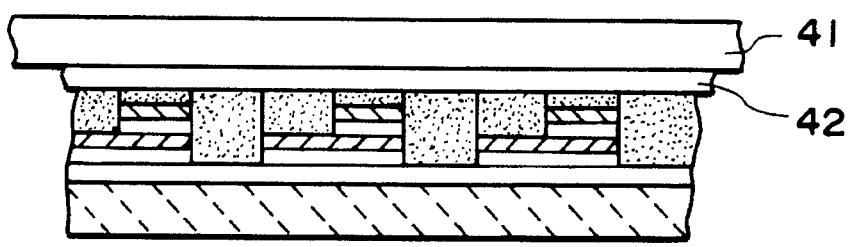
FIGS. 4A and 4B illustrate the step of transferring electrodeposited layers formed on the electrodeposition original plate of FIGS. 1A and 1B, to a transparent substrate.
Figure 4B:
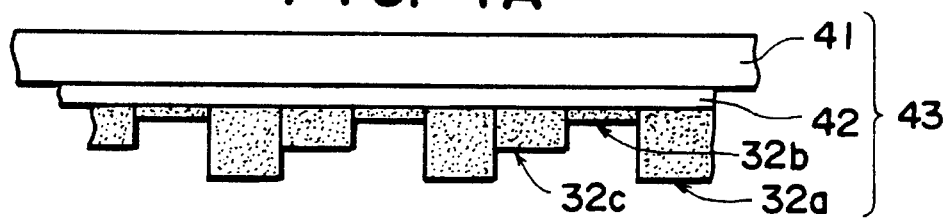

Next, as shown in FIGS. 4A and 4B, to the electrodeposition original plate on which the electrodeposited layers 32a, 32b and 32c have been formed, a transparent substrate 41 bearing a transfer layer 42 such as a photocurable adhesive layer is contact-bonded, followed by irradiation with light to cause the transfer layer and the electrodeposited layers to set (FIG. 4A) so that the electrodeposited layers 32a, 32b and 32c are transferred to the transparent substrate 41. Thus, a color filter 43 according to the present invention can be obtained (FIG. 4B).

This process, compared with conventional processes for producing color filters by electrodeposition, which makes it unnecessary to take the step of photolithography every time when the electrodeposited layers with different hues of one color filter are formed, can produce one color filter only by carrying out the electrodeposition thrice and transferring the resulting electrodeposited layers to the substrate, so long as the electrodeposition original plate is prepared once, and makes it possible to precisely produce color filters with less expense.

Figure 5A:
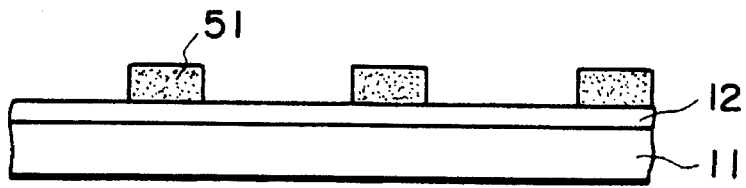
FIGS. 5A to 5F are a flow chart to show a process for producing the electrodeposition original plate of FIGS. 1A and 1B.
Figure 5B:
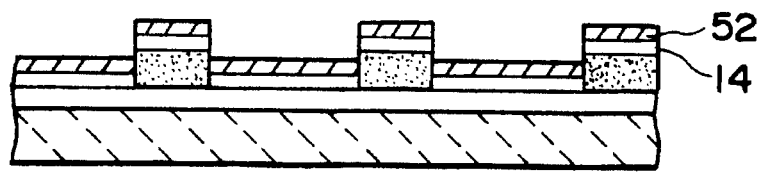
Figure 5C:
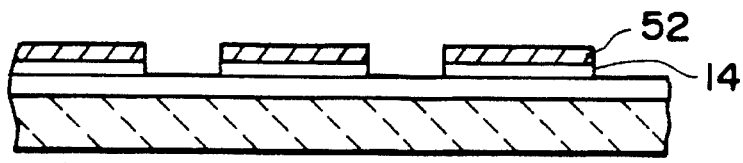

The process for producing a color filter according to the present invention will be described below in greater detail. The electrodeposition original plate used in the process described above can be readily prepared by, for example, what is called "lifting-off". More specifically, as shown in FIG. 5A, a resist pattern 51 corresponding to the pattern Pc is first formed on a conductive layer 12 provided on a substrate 11. Thereafter, an insulating layer 14 and a conductive layer 52 are formed as shown in FIG. 5B, and then the resist pattern 51 is stripped (FIG. 5C).

Figure 5D:
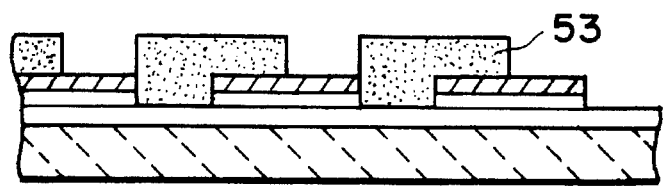
Figure 5E:
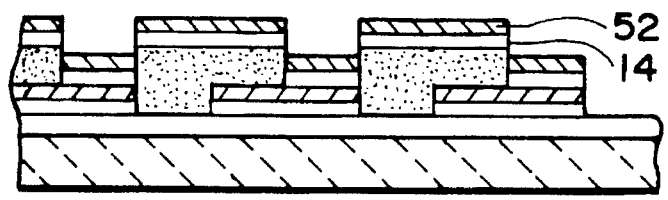
Figure 5F:
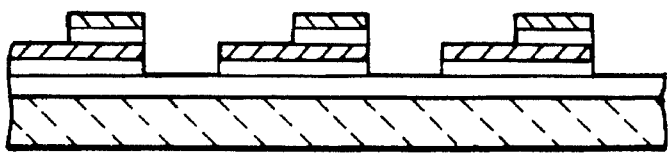

Next, a resist pattern 53 corresponding to the patterns Pb and Pc is formed (FIG. 5D). Thereafter, the insulating layer 14 and the conductive layer 52 are again formed as shown in FIG. 5E, and finally the resist pattern 53 is stripped. Thus, the electrodeposition original plate of FIGS. 1A and 1B can be obtained as shown in FIG. 5F.

Here, there are no particular limitations on the materials for the insulating layer 14 of the electrodeposition original plate, and an organic or inorganic material can be used, which may include, for example, inorganic dielectrics such as silicon oxide (e.g., SiO, $SiO_2$), silicon nitride (e.g., $Si_3N_4$), aluminum oxide (e.g., $Al_2O_3$) and aluminum nitride (e.g., AlN) and organic polymers such as polyvinyl alcohol, polystyrene, polyethylene, polyvinyl acetate, polymethyl methacrylate, polyvinyl chloride, Teflon and nylon. There are also no particular limitations on the materials for the conductive layer 52 that functions as an electrode, formed on the insulating layer, which may include, for example, metals such as Cu and Al and materials capable of forming transparent conductive films, such as indium oxide and ITO.

There are also no particular limitations on the methods for forming these insulating layer and conductive layer. Vacuum deposition processes such as metallizing and sputtering are preferable since they can relatively readily form films with a uniform thickness.

The insulating layer 14 and the conductive layer 52 may each have a layer thickness of from 60 to 3,000 Å, and particularly from 100 to 2,000 Å. The layers with such thickness make it possible to ensure electrical independence of the respective conductive patterns and also to improve the uniformity in thickness of the electrodeposited layers formed on the respective conductive patterns.

In an instance in which the insulating layer comprises a transparent insulating layer formed of $SiO_2$ or the like, the conductive layer comprises a transparent conductive layer formed of $InO_2$ or the like and the substrate 11 of the electrodeposition original plate also comprises a transparent substrate, the electrodeposition original plate itself can be used as a color filter.

With regard to the thickness of the electrodeposited layer deposited on the electrode of each pattern of the electrodeposition original plate described above, it may preferably be in the range of from 0.05 to 0.5 μm. This thickness can be controlled basically by the quantity of electricity (current×time) applied when the electrodeposition is carried out.

The resin suitable for electrodeposition that can be used in the present invention may include resins conventionally used in electrodeposition coating. For example, in the case of an anionic electrodeposition coating, it is preferable to use resins or prepolymers having, or incorporated with, an anionic functional group such as a carboxyl group so that negative charges and hydrophilic properties necessary for the deposition of resins can be imparted. In the case of a cationic electrodeposition coating, it is also preferable to use resins or prepolymers having, or incorporated with, a cationic functional group such as an amino group so that positive charges and hydrophilic properties can be imparted.

Stated specifically, it is possible to use acrylic resins, epoxy resins, polyester resins, polyamide resins, acrylmelamine resins or alkyd resins having the above anionic functional group or cationic functional group, or prepolymers thereof, as well as resins of a type capable of setting as a result of the reaction of a double bond in the molecule, specifically including polybutadiene resins and $\alpha,\beta$-ethylenically unsaturated compounds.

The resin suitable for electrodeposition may also be any of cold-setting resins, thermosetting resins and radiation energy setting resins such as ultraviolet or electron radiation setting resins. Of these resins, those having no self-crosslinkability may be used in combination with a mixture containing a curing agent as exemplified by a melamine resin or a block polyisocyanate compound.

The coloring matter incorporated into the respective electrodeposited layers is appropriately selected and employed taking account of its environmental stability or heat resistance in the electrodeposited layers. For example, as an organic coloring matter used when red electrodeposited layers are formed, red pigments of an azo metal salt type or red oil-soluble dyes such as C.I. Solvent Red 8 may be used. In the case of green electrodeposited layers, dyes as exemplified by Phthalocyanine Green may be used. In the case of blue electrodeposited layers, dyes as exemplified by Phthalocyanine Blue and Monastral Fast Blue may be used.

Referring to the transfer layer 42 used when the electrodeposited layers formed on the electrodeposition original plate is transferred to the transparent substrate 41 as shown in FIGS. 4A and 4B, this is a layer having the function of transferring to the substrate the electrodeposited layers formed on the electrodes in the original plate and holding the electrodeposited layers on the substrate.

The transfer layer can be exemplified by an adhesive layer containing an adhesive, and any layer may be used so long as they have the above described function.

Examples in which the transfer layer is the adhesive layer can be those in which the adhesive comprises a photosensitive adhesive, a heat-sensitive adhesive or a pressure-sensitive adhesive, as well as a thermosetting adhesive, a thermoplastic adhesive, synthetic rubber, natural rubber, gelatin, paste or the like.

In the case when the transfer layer is the adhesive layer, the adhesive may be of any form of a liquid, an emulsion, a sheet and microcapsules. Of these, those having the form of a liquid include those which become unfluid to solidify after their coating and those which are used before they solidify.

The adhesive for the adhesive layer used as the transfer layer may include, in the case of the photosensitive adhesive, ultraviolet radiation setting adhesives, capable of setting upon irradiation with ultraviolet rays. Of these, acrylic ultraviolet radiation setting adhesives, polyester type ultraviolet radiation setting adhesives and epoxy type ultraviolet radiation setting adhesives are preferred.

In the case of the pressure-sensitive adhesive, it can be exemplified by thermoplastic rubber type hot-melt adhesives.

The photosensitive, heat-sensitive or pressure-sensitive adhesive may also be used in the form of microcapsules. This is a type wherein the wall material of microcapsules is made active to light, heat or pressure, respectively, and a curing agent, a cross-linking agent, a solvent, a plasticizer, etc. are encapsulated into them, to which the action of light, heat or pressure is applied so that the adhesive force can be imparted.

In the case of the thermosetting adhesives, those capable of causing a cross-linking reaction upon heating as exemplified by epoxy resin adhesives are preferable. Those cross-linkable by heat and pressure as exemplified by phenol resins, resorcinol resins, urea resins and melamine resins are also preferable.

In the case of the thermoplastic adhesives, those capable of setting upon heating and solidifying upon cooling as exemplified by polymers of vinyl monomers such as vinyl acetate, acrylate, vinyl chloride, ethylene, acrylic acid, acrylamide and styrene, copolymers thereof and epoxy resins are preferable.

To carry out the transfer, the substrate 41 provided with the transfer layer 42 and the original plate provided with the electrodeposited layers are superposed so that the transfer layer comes into face-to-face contact with the electrodeposited layers. In the case when, for example, the transfer layer comprises the photosensitive adhesive, they are irradiated with light in that state and thereafter the substrate is separated from the original plate. Thus, the electrodeposited layers can be provided on the substrate via the transfer layer 42.

The transfer layer may be provided on the substrate by coating. In the case when the adhesive is in the form of a sheet, it may be inserted between the original plate on which the electrodeposited layers have been formed and the substrate when used.

In the case when the transfer layer comprises the heat-sensitive adhesive, pressure-sensitive adhesive, thermosetting adhesive or thermoplastic adhesive, the original plate on which the electrodeposited layers have been formed and the substrate are put together via the transfer layer with the electrodeposited layers inside, followed by heating, pressing, or heating and pressing, respectively, and thereafter separated. In the case when the transfer layer comprises the adhesive, they may be pressed and then separated.

Incidentally, in the embodiment described above on the process for producing a color filter, the examples shown are those in which the patterns with different hues are arranged in such a manner that their pattern elements comprised of the same coloring matter come into touch with each other so that voltages can be applied with ease at the time of electrodeposition. In this instance, the electrodes can not have all the same shapes between the three kinds of patterns. Then, connecting portions between pattern elements as shown in FIG. 6 may be made to have a width 61 of from 10 to 300 μm, and particularly from 10 to 100 μm. This makes it possible to apply a voltage to electrodes of the same pattern from one lead and also has no great influence on the performance required for color filters. Thus, this is a preferable measure.

Another embodiment of the process for producing a color filter according to the present invention will be described below.

In the color filter obtained according to this embodiment, as shown in FIG. 7A, electrodeposited layers 70-1, 70-2 and 70-3 with different hues can be made to have entirely the same size. Hence, the process according to this embodiment is a process suited for producing more highly detailed and more highly precise color filters.

In this embodiment, first, as shown in FIGS. 7A and 7B, a substrate having conducting portions 72 passing through the substrate to its back, at the respective centers of the areas in which the electrodes are formed, is made ready as a substrate 71 for the electrodeposition original plate.

Figure 8A:
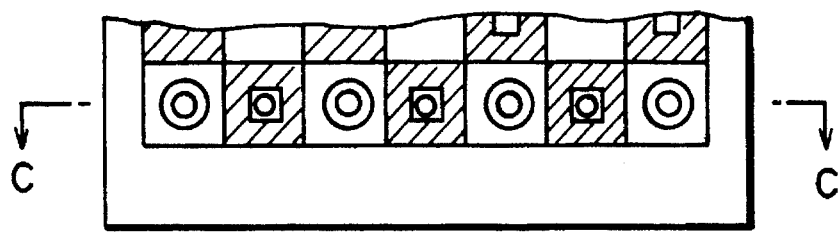
FIGS. 8A to 8C are a schematic flow chart to show a process for producing the electrodeposition original plate making use of the substrate shown in FIG. 7B, where
Figure 8B:
Figure 8C:

Next, as shown in FIGS. 8A and 8B, a resist pattern 73 that can provide a photoresist layer in the area adjoining to the given areas in which the electrodes to be provided with electrodeposited layers thereon are formed is prepared by photolithography. Next, on the surface of this substrate on its side on which the resist pattern has been formed, a conductive layer 74 is formed (FIG. 8C). Here, there are no particular limitations on the conductive layer so long as it can serve as an electrode when electrodeposited layers are formed, and may include, for example, metals such as Ni, Cu and Al and transparent conductive layers made of indium oxide or ITO. The conductive layer can be formed by a process including vacuum deposition processes such as metallizing and sputtering. The conductive layer may also have a layer thickness of from 60 to 3,000 Å, and particularly from 100 to 2,000 Å, so as for the conductive layer to be formed in a uniform thickness in the areas in which the electrodes are formed.

Figure 9A:
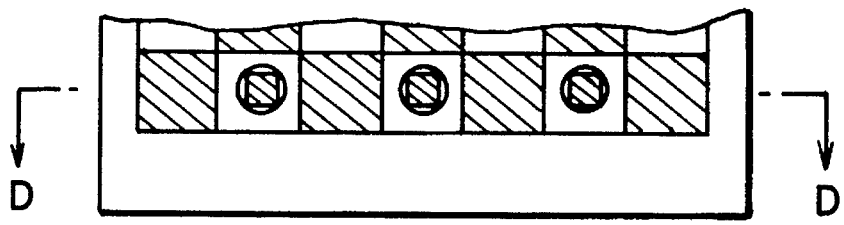
FIGS. 9A and 9B schematically illustrate the step of preparing the electrodeposition original plate making use of the substrate shown in FIG. 7B, where
Figure 9B:
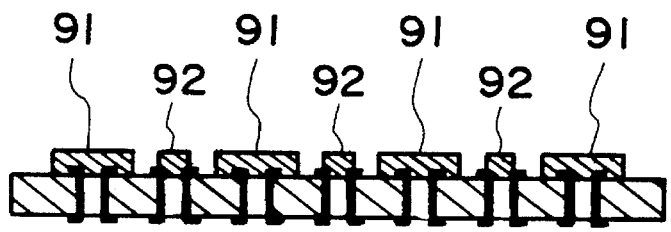

Subsequently, the photoresist 73 is stripped using a remover or the like to patternwise form the conductive layer on the respective conducting portions as shown in FIG. 9B. In FIG. 9B, conductive layer regions 91 among conductive layer regions 91 and 92 that constitute a conductive pattern serve as electrodes 13 of the electrodeposition original plate.

Figure 10:
FIG. 10 is a schematic cross section of the substrate of FIG. 9B on the surface of which a resist pattern has been formed.

Next, on the surface of the substrate on its side on which the conductive pattern has been formed, a resist pattern 101 is formed in the manner that it covers the conductive layer surfaces (FIG. 10).

Figure 11:
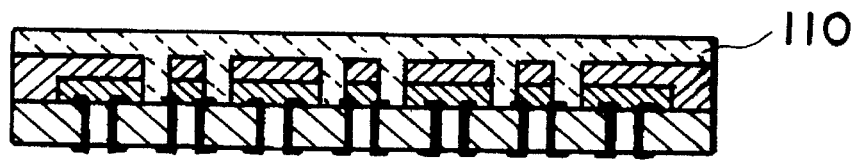
FIG. 11 is a schematic cross section of the substrate of FIG. 10 on the surface of which an insulating layer has been formed.

Then, an insulating layer 110 is formed on this resist pattern 101 (FIG. 11). Here, as materials for the insulating layer 110, it is possible to use, for example, transparent or opaque inorganic insulating materials such as silicon oxide, silicon nitride and aluminum oxide, and organic polymers as exemplified by polyvinyl alcohol, polystyrene, polyvinyl acetate, polymethyl methacrylate and polyvinyl chloride. The insulating layer can be formed not only by the vacuum deposition previously mentioned but also by coating. The insulating layer 110 may preferably have a thickness larger than the thickness of the conductive layer 91. This is preferable for ensuring the electrical independence between the respective electrodes. In particular, a thickness larger than (the thickness of the conductive layer 91+the thickness of the resist pattern 101) is preferred.

Figure 12:
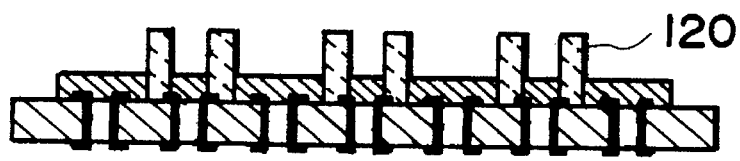
FIG. 12 is a schematic cross section of the substrate of FIG. 11 on the surface of which an insulating layer pattern has been formed.

Next, the resist pattern 110 is stripped to form an insulating layer pattern 120 (FIG. 12).

Figure 13:
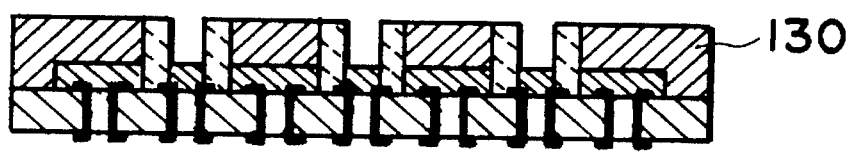
FIG. 13 is a schematic cross section of the substrate of FIG. 12 on the surface of which a resist pattern has been formed.

Subsequently, as shown in FIG. 13, a resist pattern 130 is formed in the manner that it covers the conductive pattern 91. Here, the resist pattern 130 may preferably have a thickness of, e.g., from 100 to 10,000 Å, and particularly from about 500 to 3,000 Å.

Figure 14:
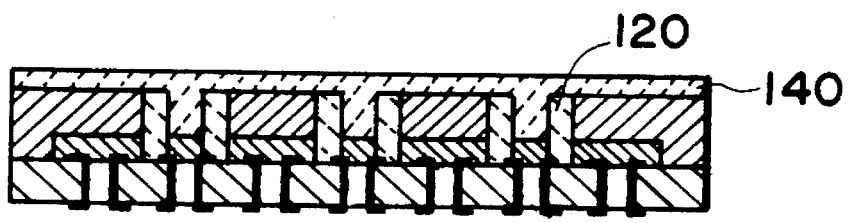
FIG. 14 is a schematic cross section of the substrate of FIG. 13 on the surface of which a conductive layer has been formed.
Figure 15A:
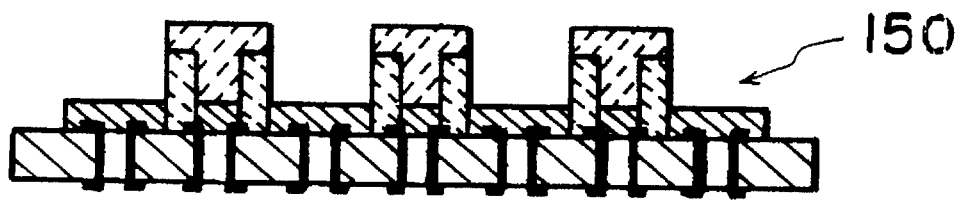
FIGS. 15A and 15B schematically illustrate an electrodeposition original plate used to produce the color filter of FIG. 7A, where

Next, a conductive layer 140 is formed on the surface of the substrate on its side on which the resist pattern 130 has been formed (FIG. 14). Here, as materials and film forming methods for the conductive layer, those previously described may be used. The conductive layer 140 may preferably be so formed that the height of the conductive layer 140 formed on the conductive pattern 92 exceeds the height of the insulating pattern 120, in particular, in such a thickness that, as shown in FIG. 14, the surface of the resist pattern 130 is also covered with the conductive layer 140 and the surface of the conductive layer 140 is substantially flat. Stated specifically, the thickness may preferably in the range of from 60 to 3,000 Å, and more preferably from 100 to 2,000 Å. Namely, when the resist pattern 130 is stripped in the subsequent step to obtain an electrodeposition original plate 150 according to this embodiment as shown in FIG. 15A, the conductive layer 140 made thick enough for its surface to become substantially flat can substantially eliminate planar spaces between electrodes, so that an electrodeposition original plate capable of providing a highly precise color filter can be obtained.

Figure 15B:
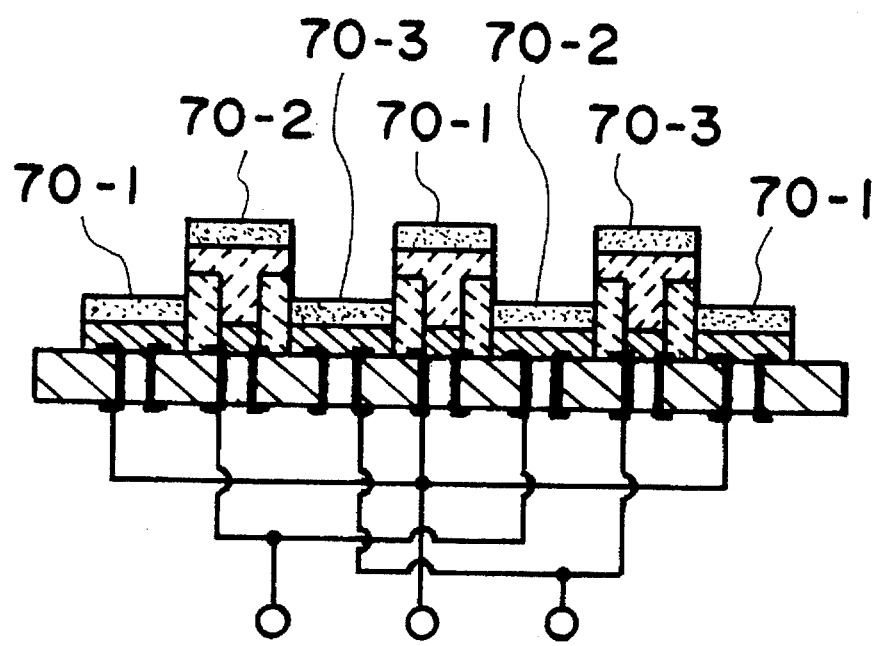

Next, the electrodeposition original plate 150 thus obtained is successively immersed in electrodeposition coating compositions used to form electrodeposited layers with different hues, and also voltages are correspondingly applied from the conducting portions on the back of the substrate to the electrodes on which the electrodeposited layers with different hues are to be formed, so that, as shown in FIG. 15B, the electrodeposited layers 70-1, 70-2 and 70-3 can be formed independently on the electrodes of the same kind.

Figure 17A:
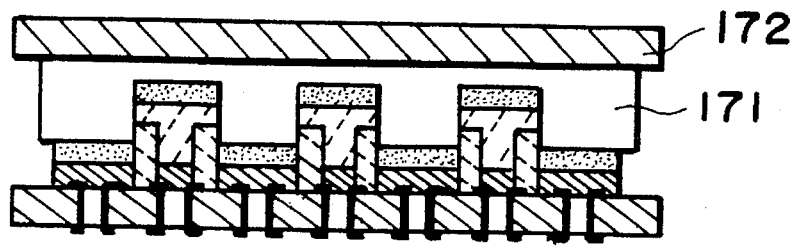
FIGS. 17A and 17B illustrate the step of transferring electrodeposited layers formed on electrodes of the color filter of FIG. 15B, to a substrate.
Figure 17B:
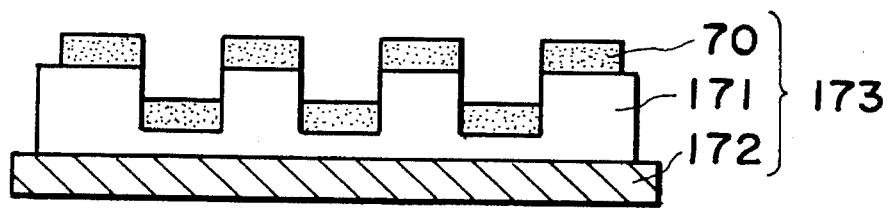

Then, as shown in FIGS. 17A and 17B, the electrodeposited layers 70-1, 70-2 and 70-3 are transferred to a transparent substrate 172 via a transfer layer 171. Thus, a color filter 173 according to this embodiment can be obtained.

Figure 18:
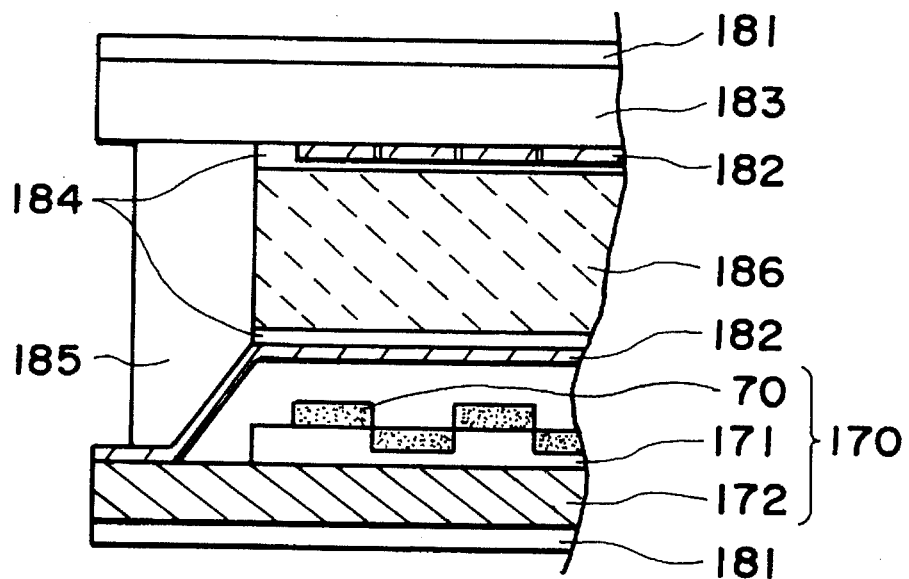
FIG. 18 is a schematic cross section to show an example in which the electrodeposition original plate according to the present invention is applied to a color display device.

The color filter obtained through the process described above can be applied in a color display device such as a color liquid-crystal display device for computers, having, for example, the construction as shown in FIG. 18 such that a liquid crystal 186 is sealed in a liquid-crystal cell assembled using polarizing sheets 181, a glass substrate 183, ITO thin films 182, aligning films 184 and a spacer 185.

The process for producing a color filter according to the present invention as described above can be applied in a process for producing a substrate having two or more kinds of patterns on its surface, i.e., a patterning process. For example, it can be applied to the production of optical recording mediums comprised of a substrate, and a preformat and a recording layer which are respectively patternwise formed on its surface.

Figure 16A:
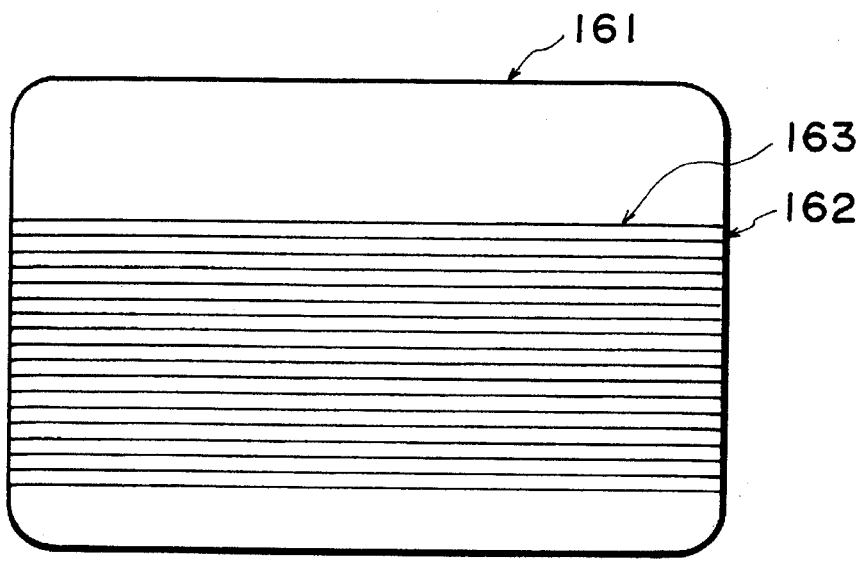
FIGS. 16A to 16C schematically illustrate an example in which the patterning process according to the present invention is applied to a process for producing an optical recording medium, where
Figure 16B:
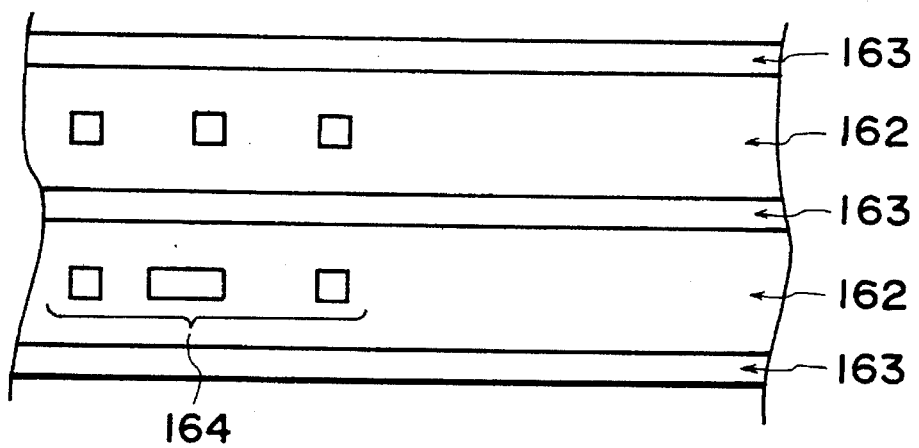
Figure 16C:
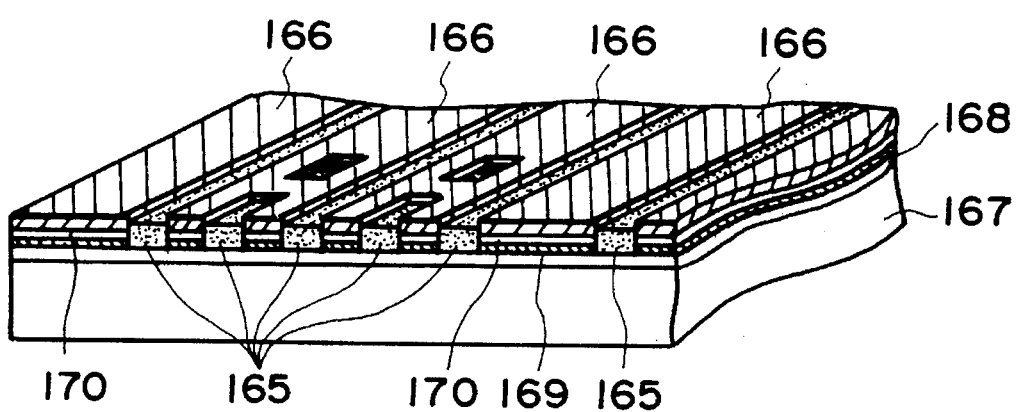

FIGS. 16A to 16C illustrate how the patterning process of the present invention is applied to a process for producing an optical recording medium. FIG. 16A schematically show the positional relationship between a preformat of an optical card and a recording layer, FIG. 16B show in more detail positional relationship between the preformat and the recording layer, and FIG. 16C is a diagrammatic illustration of an instance in which the preformat and the recording layer are formed by electrodeposition.

An optical card 161 has the same size as that of a credit card of 54.0 mm long ×85.6 mm wide ×0.76 mm thick, and is provided thereon with recording regions 162 in which optically recordable recording layers are arranged.

As for the preformat, it is commonly comprised of, e.g., 3 μm wide stripelike tracking tracks 163 for receiving AT signals, and pits 164 for indicating track number and so forth which are provided at ends of the recording regions 162 having the recording layers.

As a process for producing such an optical card, an example in which the preformat and the recording layers are formed by electrodeposited layers 165 and 166 is shown in FIG. 16C.

A conductive layer 168 is first provided on a substrate 167. Then a pattern comprised of insulating layers 169 such as $SiO_2$ layers and conductive layers 170 such as chromium layers superposingly provided thereon is formed by lifting-off.

As a result, an electrodeposition original plate is obtained, having a preformat forming conductive pattern comprised of bared portions of the conductive layer 168 and a recording layer forming conductive pattern comprised of the conductive layers 170, and capable of forming electrodeposited layers independently on the respective conductive patterns.

Next, on each of the conductive patterns, preformat layers 165 and recording layers 166 are formed by electrodeposition. The electrodeposited layers thus prepared are transferred to separate card substrates whereby optical cards can be duplicated in a large quantity, in the same way as the color filters previously described.

Without the step of transfer, the electrodeposition original plates themselves may be formed into optical cards.

In this embodiment, the electrodeposited layers 166 serving as recording layers can be formed by electrodeposition using an electrodeposition coating composition in which particles serving as a recording material have been dispersed. The particles serving as a recording material may include, for example, as organic coloring matters, polymethine dyes, cyanine dyes, naphthoquinone dyes, anthraquinone derivatives, chromanium compounds, azo compounds, phthalocyanine pigments and carbon black; and as inorganic materials, metals and semimetals as exemplified by low-melting substances such as Bi, Sn and Te or complex compounds comprising any of these with which As, Se, S, O, C or the like has combined, $Te-TeO_2$ type materials capable of being recorded by phase changes, and silver halides capable of being recorded by changes in optical density. Materials feasible for magneto-optical recording or thermal recording may also be used as materials for the recording layer. Phthalocyanines have a relatively high reflectance among dyes and pigments and are excellent in their stability in electrodeposited layers, and hence may preferably be used as recording materials dispersed in the electrodeposition coating composition in this embodiment.

The recording material may preferably be contained in the recording layer formed of an electrodeposited layer, in an amount ranging from 5 to 50% by weight, particularly from 10 to 40% by weight, and more preferably from 20 to 35% by weight, taking account of the recording sensitivity of recording layers and the film quality of electrodeposited layers, e.g., flexibility and adhesion. The content of the recording material in the electrodeposited layer can be analyzed using a thermogravimetric analyzer when the recording material is conductive, and can be analyzed on the basis of light transmittance when the recording material is an organic dye or pigment.

The properties possessed by the electrodeposited layer 165 that constitutes a preformat may preferably be changed according to the reflectance to recording-reproducing light of the electrodeposited layer 166. For example, when the electrodeposited layer 166 shows a reflectance of 5 to 40% to light with wavelengths of 780 to 860 nm, the electrodeposited layer 165 may preferably be so composed as to show substantially a higher reflectance than the electrodeposited layer 166. Stated specifically, when the recording layer is incorporated with a phthalocyanine, the preformat layer may preferably be so composed as to contain a metal or a metallized powder.

When the recording layer is composed to show a high reflectance, e.g., a reflectance of 10 to 60% to light with wavelengths of 780 to 860 nm, the preformat layer may preferably be so composed as to show substantially a lower reflectance than the electrodeposited layer. Stated specifically, when the recording layer is incorporated with Te, the preformat layer may preferably be so composed as to contain light-diffusing particles or its electrodeposited layer to have a porous structure.

Such electrodeposited layers can be prepared by the method disclosed in Japanese Patent Application Laid-open No. 5-282706 concerning an application as filed by the present applicant.

As described above, according to the present invention, the step of photolithography and the step of electrodeposition can be separated in a patterning process in which plural kinds of patterns are formed on a substrate. Hence, compared with the conventional process in which the step of photolithography and the step of electrodeposition are put together, the work efficiency can be greatly improved and also the positional relative precision between plural patterns can be stably maintained at a high level.

Moreover, when used in combination with a transfer system, the electrodeposition original plate functions as a master substrate, so that it becomes possible to make duplicates in a large quantity and a great cost decrease can be achieved.

According to the present invention, a color filter having a superior pattern precision for each hue can also be produced at a low cost. In addition, according to the present invention, an optical recording medium having a superior positional precision between the preformat pattern and the recording layer pattern can be produced at a low cost.

Furthermore, according to the present invention, the electrodeposited layers that constitute different patterns can be arranged on a substrate with our providing spaces, so that fine patterning can be applied to the substrate. Still furthermore, when the patterning process of the present invention is applied to the production of, e.g., color filters, a color filter free from spaces between electrodeposited patterns with different hues can be produced, making it possible to provide color filters for highly detailed color display devices at a much lower cost. Still furthermore, when the patterning process of the present invention is applied to the production of, e.g., optical recording mediums, spaces between recording layers and preformat layers can be eliminated, so that an improvement in recording density of the optical recording mediums can be achieved with ease.

EXAMPLES

The present invention will be described below in greater detail by giving Examples.

Example 1

First, an electrodeposition original plate used to produce a color filter was prepared according to the process as shown in FIGS. 5A to 5F.

More specifically, a glass plate (400 mm wide ×400 mm long ×5 mm thick) one surface of which had been mirror-polished was made ready as an original-plate substrate 11. On the mirror surface of this glass plate, a transparent electrode 12 comprising indium oxide was formed by sputtering in a film with a thickness of 1,000 Å.

Next, on this transparent electrode 12, a photoresist (trade name: WAYCOAT HPR 204; available from Fuji-Hunt Electronics Technology Co.) was coated using a roll coater so as to have a dried coating thickness of 0.1 µm, followed by prebaking at 100° C. for 20 minutes to form a photoresist layer. Subsequently, the photoresist layer was exposed to ultraviolet rays through a mask, followed by development, and then the photoresist at the exposed area was removed to form a resist pattern 51 on the transparent electrode 12 (FIG. 5A). The resist pattern 51 was so formed as to correspond with the pattern Pc of the electrodeposition original plate shown in FIG. 1A.

Next, on the transparent electrode 12 on which the resist pattern 51 had been formed, an $SiO_2$ film was formed by metallizing as an insulating layer 14 in a thickness of 1,000 Å, and thereafter Al was deposited by metallizing as a conductive layer 52 in a thickness of 1,000 Å (FIG. 5B).

Subsequently, the resist pattern on the transparent electrode 12 was subjected to lifting-off so as to strip the insulating layer and conductive layer on the resist pattern 51, to carry out the patterning of an $SiO_2$-Al double-layered film (FIG. 5C).

Next, on this $SiO_2$-Al double-layered film, a photoresist layer was formed, followed by exposure and development to form a resist pattern 53 (FIG. 5D). The resist pattern 53 was formed on bared portions (corresponding to the pattern Pc) of the transparent electrode 12 and on the portions corresponding to the pattern Pb on the $SiO_2$-Al double-layered film. Subsequently, on the resist pattern 53 and the Al film 52, an $SiO_2$ film was formed by metallizing as another insulating layer 14 in a thickness of 1,000 Å, and then Al was deposited by metallizing as another conductive layer 52 in a thickness of 1,000 Å (FIG. 5E). Thereafter, the resist pattern 53 was stripped using a remover. Thus, an electrodeposition original plate having three kinds of conductive patterns corresponding to the patterns Pa, Pb and Pc and insulated one another was obtained (FIG. 5F).

Meanwhile, 20% by weight of an azo metal salt red pigment was dispersed in 80% by weight of an acrylmelamine resin (trade name: HONEY BRIGHT C-IL; available from Honey Chemical Co.), and the dispersion was diluted with desalted water to have a solid-matter concentration of 15% by weight to prepare a electrodeposition coating composition R used to form red electrodeposited layers.

Using Phthalocyanine Green and Phthalocyanine Blue in place of the above azo metal salt red pigment, electrodeposition coating compositions G and B used to form green electrodeposited layers and blue electrodeposited layers, respectively, were also prepared.

Next, the electrodeposition original plate previously produced was immersed in the electrodeposition coating composition R. Then the lead La as shown in FIG. 1A was connected to the anode of a DC power source and the opposing electrode 31 was connected to the cathode, where a DC voltage of 30 V was applied for 1 minute to carry out deposition to form red electrodeposited layers. Thereafter, the original plate was drawn up and then washed with water.

Subsequently, this original plate was immersed in the electrodeposition coating composition G, and the lead Lb as shown in FIG. 1A was connected to the anode of a DC power source, where a DC voltage of 30 V was applied for 1 minute to carry out deposition to form green electrodeposited layers. Thereafter, the original plate was drawn up and then washed with water.

Next, this original plate was immersed in the electrodeposition coating composition B, and the lead Lc as shown in FIG. 1A was connected to the anode of a DC power source, where a DC voltage of 30 V was applied for 1 minute to carry out deposition to form blue electrodeposited layers. Thereafter, the original plate was drawn up and then washed with water. Next, this original plate was heated at 97° C. for 60 minutes to effect curing. After the curing, the electrodeposited layers were in a thickness of 3 µm.

Next, one surface of a transparent acrylic substrate of 400 mm long ×400 mm wide ×2 mm thick was coated with an ultraviolet radiation setting adhesive (trade name: UVX-SS120; available from Three Bond Co., Ltd.) to form an adhesive layer. This acrylic substrate and the original plate was superposed so that the former's adhesive layer and the latter's electrodeposited layers came into face-to-face contact, followed by exposure to light of 750 J/cm² (exposure surface) using a metal halide lamp from the side of the acrylic substrate, to cause the adhesive layer to cure and cause the electrodeposited layers to transfer to the surface of the acrylic substrate. Thus, a color filter was obtained.

This color filter was observed using an optical microscope to reveal that no faulty transfer of the electrodeposited layers was seen and also there were no spaces between the electrodeposited layers with different hues. Thus, the color filter was well suited as a color filter for a highly detailed color display device.

The original plate used to produce the above color filter was repeatedly used in entirely the same manner as described above, to produce 100 color filters in total. As a result, no non-uniformity in quality (e.g., doubling of patterns with different hues) was seen in the color filters.

Example 2

An electrodeposition original plate used to produce the optical card as shown in FIG. 16C was prepared in the following way.

On a glass plate of 0.5 mm thick ×10 cm long ×6 cm wide, Al was deposited by metallizing in a thickness of 300 Å to form a conductive layer 168.

On the Al film thus formed, a photoresist (trade name: WAYCOAT HPR 204; available from Fuji-Hunt Electronics Technology Co.) was coated using a spinner in a thickness of 2 µm, followed by prebaking at 100° C. for 20 minutes. Thereafter, the preformat pattern formed was exposed to ultraviolet light, followed by development to form a resist pattern corresponding to stripelike tracking tracks of 3 µm wide and 12 µm pitch and a resist pattern corresponding to address pits.

Next, on the resist patterns, $SiO_2$ was deposited by sputtering as an insulating layer 169 in a thickness of 200 Å, and then Al was deposited by sputtering as a conductive layer 170 in a thickness of 200 Å.

Subsequently, the resist was lifted off to prepare an electrodeposition original plate having $SiO_2$-Al double-layered films arranged in the regions other than the portions corresponding to the tracking tracks and address pits on the Al film.

Next, a cationic photosensitive resin composition comprising 80 parts by weight of an organic polymer obtained by copolymerizing N,N-diethylaminoethyl methacrylate, styrane, acrylate and a compound synthesized by equimolar reaction of p-hydroxybenzoic acid with glycidyl acrylate, in a molar ratio of 3:2:4:1 to have a weight average molecular weight of 70,000, 0.5 part by weight of 2,2-dimethoxy-2-phenylacetophenone and 14.5 parts by weight of trimethylolpropane triacrylate was diluted with ethylene glycol monobutyl ether to have a volatile content of 80% by weight. The composition thus diluted was neutralized with 0.5 equivalent weight of acetic acid, and then adjusted with pure water to have a volatile content of 90% by weight, to obtain an electrodeposition resin composition.

In 80% by weight of this electrodeposition resin composition, 20% by weight of phthalocyanine with particle diameters of 0.1 to 0.3 μm was dispersed as a recording material. Thus, a recording layer forming electrodeposition coating composition was prepared.

In 80% by weight of the electrodeposition resin composition described above, 20% by weight of Ni particles with an average particle diameter of 0.1 μm were dispersed. Thus, a preformat layer forming electrodeposition coating composition was prepared.

Subsequently, the original plate prepared as described above was immersed in the recording layer forming electrodeposition coating composition, where, using the conductive layer 170 as the cathode, a DC voltage of 30 V was applied for 1 minute to carry out deposition to form recording layers 166. Then, the original plate was drawn up, washed with water, and thereafter immersed in the preformat layer forming electrodeposition coating composition, where, using the conductive layer 168 as the cathode, a DC voltage of 30 V was applied for 1 minute to carry out deposition to form preformat layers 165.

Thus, the original plate successively provided with the recording layers and preformat layers was thoroughly washed with water, and thereafter cured using a high-pressure mercury lamp (200 mJ/cm$^2$).

After the curing, the recording layers and the preformat layers had in a thickness of 3 μm.

Next, the original plate having been thus subjected to electrodeposition and a transparent polymethyl methacrylate substrate of 0.4 mm thickness were put together with the electrodeposited layers inside, and bonded via a sheet comprising an ethylene/ethyl acrylate copolymer, using a laminator having a roller temperature of 130° C.

Next, the substrate was separated from the original plate, so that the electrodeposited layers were transferred to the transparent polymethyl methacrylate substrate.

In the recording layers, phthalocyanine was present in an amount of 25% by weight. In the preformat layers, Ni was present in an amount of 30% by weight.

On the substrate having the patterned recording layers and preformat layers thus formed, a hot-melt adhesive layer comprising an ethylene/ethyl acrylate copolymer and as a protective layer a 0.3 mm thick polymethyl methacrylate substrate were successively superposingly formed.

The resulting product was cut in optical card size (86 mm×54 mm) to obtain an optical card.

This optical card was observed using an optical microscope to reveal that there were no spaces between the recording layers and the preformat layers, showing that the pattern of recording layers and the pattern of preformat layers stood in a very good positional precision.

On this optical card, a light beam was made to scan across the preformat layers to observe track cross signals.

As a result, the contrast of the track cross signals had a maximum value, a minimum value and an average value as shown below.

Maximum value: 0.72

Minimum value: 0.70

Average value: 0.70

What is claimed is:

1. A process for patterning a substrate by forming electrodeposited layers on the substrate to provide two or more patterns, wherein said process comprises the steps of;

preparing an electrodeposition original plate having conductive areas corresponding to said patterns, at least a part of the conductive areas being exposed, said conductive areas being separated from each other by an insulating layer and at least adjacent conductive areas provided on different planes so that the electrodeposited layers are respectively independently formed on the conductive areas;

successively forming the electrodeposited layers on the respective conductive areas; and transferring the resulting electrodeposited layers to a substrate.

2. The patterning process according to claim 1, wherein the electrodeposited layers formed on the respective conductive areas have substantially the same chemical composition.

3. The patterning process according to claim 1, wherein the electrodeposited layers formed on the respective conductive areas have different chemical compositions.

4. A process for producing a color filter comprising a transparent substrate and provided thereon electrodeposited layers with different colors, arranged in patterns, said process comprising the steps of;

preparing an electrodeposition original plate having conductive areas corresponding to said patterns, at least a part of the conductive areas being exposed, said conductive areas being separated from each other by an insulating layer and at least adjacent conductive areas provided on different planes so that the electrodeposited layers are respectively independently formed on the conductive areas;

successively forming differently colored electrodeposited layers on the respective conductive areas; and transferring the electrodeposited layers formed on the conductive areas, to a transparent substrate.

5. The process for producing a color filter according to claim 4, wherein said conductive areas comprise at least three different conductive areas.

6. The process for producing a color filter according to claim 5, wherein said conductive areas of said electrodeposition original plate respectively correspond to electrodeposited layers having three different colors.

7. The process for producing a color filter according to claim 4, wherein said electrodeposition original plate permits simultaneous deposition of all of the electrodeposited layers having the same color on the corresponding conductive areas.

8. The process for producing a color filter according to claim 4, wherein said conductive areas of said electrodepositon original plate are formed of a metal.

9. The process for producing a color filter according to claim 4, wherein said conductive areas of said electrodeposition original plate are transparent.

10. A process for producing a color filter comprising a transparent substrate and provided thereon electrodeposited layers with different colors, arranged in patterns, said process comprising the steps of;

preparing an electrodeposition original plate having conductive areas corresponding to said patterns, at least a part of the conductive areas being exposed, said respective conductive areas being separated from each other by an insulating layer and at least adjacent conductive areas provided on different planes so that the electrodeposited layers respectively independently formed on the conductive areas; and successively forming differently colored electrodeposited layers on the respective conductive areas.

11. The process for producing a color filter according to claim 10, wherein said conductive areas are transparent.

12. The process for producing a color filter according to claim 10, wherein said conductive areas of said electrodeposition original plate comprise at least three different conductive areas.

13. The process for producing a color filter according to claim 12, wherein said conductive areas of said electrodeposition original plate respectively correspond to electrodeposition layers having three different colors.

14. The process for producing a color filter according to claim 10, wherein said electrodeposition original plate is formed so that electrodeposited layers are simultaneously formed on conductive areas corresponding with patterns of the same color.

15. A process for producing an optical recording medium comprising a substrate and provided thereon a recording layer having an electrodeposited layer and a preformat layer having an electrodeposited layer, formed in a pattern corresponding to a preformat, wherein said process comprises the steps of;

preparing an electrodeposition original plate having conductive areas at different heights in a direction perpendicular to a conductive surface of said original plate and an insulating layer provided between said conductive areas of differing height to insulate said conductive area of differing height from each other, wherein said conductive surface has provided thereon a first conductive pattern superposingly formed via an insulating layer and having a pattern corresponding with said preformat and a second conductive pattern formed of exposed portions of said conductive surface;

immersing said original plate in a preformat layer forming electrodepositing solution to form a first electrodeposited layer on the first conductive area, using the first conductive area as an electrode;

immersing the original plate on which the first electrodeposited layer has been formed, in a recording layer forming electrodepositing solution to form a second electrodeposited layer on the second conductive area, using the second conductive area as an electrode; and transferring the first electrodeposited layer and the second electrodeposited layer to the substrate.

16. The process for producing an optical recording medium according to claim 15, wherein, in the step of transferring the first electrodeposited layer and the second electrodeposited layer to a substrate, said first and second electrodeposited layers are transferred to said substrate via a transfer layer.

17. The process for producing an optical recording medium according to claim 15, wherein said second electrodeposited layer is a layer which causes an optically detectable change upon irradiation with a laser beam.

18. The process for producing an optical recording medium according to claim 15, wherein said second electrodeposited layer contains a recording material selected from the group consisting of an organic coloring matter, carbon black, a metal and a semimetal.

19. The process for producing an optical recording medium according to claim 18, wherein said second electrodeposited layer contains said recording material in an amount of from 5% by weight to 50% by weight.

20. The process for producing an optical recording medium according to claim 18, wherein said organic coloring matter comprises a phthalocyanine.

21. The process for producing an optical recording medium according to claim 15, wherein said recording layer has a reflectance of from 5% to 40% when light with a wavelength of 780 to 860 nm is made incident from the substrate side, and said preformat layer has a reflectance higher than the reflectance of said recording layer.

22. A process for producing an optical recording medium comprising a substrate and provided thereon a recording layer having an electrodeposited layer and a preformat layer having an electrodeposited layer, formed in a pattern corresponding to a preformat, wherein said process comprises the steps of;

preparing an electrodeposition original plate having conductive areas of differing heights in a direction perpendicular to a conductive surface of said original plate and an insulating layer provided between said conductive areas of differing height to insulate said conductive areas of differing heights from each other, and provided thereon a first conductive area superposingly formed via an insulating layer and having a pattern corresponding with said preformat and a second conductive area formed of exposed portions of said conductive surface;

immersing said original plate in a preformat layer forming electrodepositing solution to form a first electrodeposited layer on the first conductive area, using the first conductive area as an electrode; and immersing the original plate on which the first electrodeposited layer has been formed, in a recording layer forming electrodepositing solution to form a second electrodeposited layer on the second conductive area, using the second conductive area as an electrode.

23. The process for producing an optical recording medium according to claim 22, wherein, in the step of transferring the first electrodeposited layer and the second electrodeposited layer to a substrate, said first and second electrodeposited layers are transferred to said substrate via a transfer layer.

24. The process for producing an optical recording medium according to claim 22, wherein said second electrodeposited layer can cause an optically detectable change upon irradiation with a laser beam.

25. The process for producing an optical recording medium according to claim 22, wherein said second electrodeposited layer contains a recording material selected from the group consisting of an organic coloring matter, carbon black, a metal and a semimetal.

26. The process for producing an optical recording medium according to claim 25, wherein said second electrodeposited layer contains said recording material in an amount of from 5% by weight to 50% by weight.

27. The process for producing an optical recording medium according to claim 25, wherein said organic coloring matter comprises a phthalocyanine.

28. The process for producing an optical recording medium according to claim 22, wherein said recording layer has a reflectance of from 5% to 40% when light with a wavelength of 780 to 860 nm is made incident from the substrate side, and said preformat layer has a reflectance higher than the reflectance of said recording layer.

* * * * *

UNITED STATES PATENT AND TRADEMARK OFFICE
CERTIFICATE OF CORRECTION

PATENT NO. : 5,578,184

DATED : November 26, 1996

INVENTOR(S) : HIROYUKI IMATAKI, ET AL.  Page 1 of 3

It is certified that error appears in the above-identified patent and that said Letters Patent is hereby corrected as shown below:

COLUMN 1

Line 46, "contact-bonded," should read --contact-bonded--.

COLUMN 2

Line 2, "account" should read --into account--.
    Line 23, "of;" should read --of:--.
    Line 47, "of;" should read --of:--.
    Line 64, "of;" should read --of:--.

COLUMN 3

Line 13, "of;" should read --of:--.
    Line 40, "of;" should read --of:--.

COLUMN 7

Line 55, "they have" should read --it has--.

COLUMN 10

Line 11, "preferably" should read --preferably be--.
    Line 51, "show" should read --shows--.
    Line 53, "show" should read --shows--.

COLUMN 12

Line 40, "with our" should read --without--.

UNITED STATES PATENT AND TRADEMARK OFFICE
CERTIFICATE OF CORRECTION

PATENT NO. : 5,578,184

DATED : November 26, 1996

INVENTOR(S): HIROYUKI IMATAKI, ET AL.   Page 2 of 3

It is certified that error appears in the above-identified patent and that said Letters Patent is hereby corrected as shown below:

COLUMN 13

Line 37, "insulated" should read --insulated from--.
   Line 41, "acrylmelamine" should read --acryl-melamine--.

COLUMN 14

Line 15, "was" should read --were--.
   Line 65, "fane," should read --rene,--.

COLUMN 16

Line 6, "of;" should read --of:--.
   Line 29, "of;" should read --of:--.
   Line 41, "areas," should read --areas--.
   Line 63, "of;" should read --of:--.

COLUMN 17

Line 4, "layers" should read --layers are--.
   Line 27, "of;" should read --of:--.
   Line 33, "area" should read --areas--.

UNITED STATES PATENT AND TRADEMARK OFFICE
CERTIFICATE OF CORRECTION

PATENT NO. : 5,578,184

DATED : November 26, 1996

INVENTOR(S) : HIROYUKI IMATAKI, ET AL.          Page 3 of 3

It is certified that error appears in the above-identified patent and that said Letters Patent is hereby corrected as shown below:

<u>COLUMN 18</u>

Line 17, "of;" should read --of:--.

Signed and Sealed this

Third Day of June, 1997

Attest:

BRUCE LEHMAN

Attesting Officer

Commissioner of Patents and Trademarks